United States Patent
Su et al.

(10) Patent No.: US 6,787,243 B2
(45) Date of Patent: Sep. 7, 2004

(54) POLYOLEFIN OIL RESISTANT FILM USING POLAR POLYMER

(75) Inventors: Tien-Kuei Su, North Kingstown, RI (US); Leo Moreau, North Kingstown, RI (US); Kevin Kitchin, North Kingstown, RI (US)

(73) Assignee: Toray Plastics (America), Inc, N. Kingstown, RI (US)

( * ) Notice: Subject to any disclaimer, the term of this patent is extended or adjusted under 35 U.S.C. 154(b) by 0 days.

(21) Appl. No.: 10/230,268

(22) Filed: Aug. 29, 2002

(65) Prior Publication Data

US 2003/0049476 A1 Mar. 13, 2003

Related U.S. Application Data

(60) Provisional application No. 60/315,672, filed on Aug. 30, 2001.

(51) Int. Cl.$^7$ ............................................... B32B 15/08
(52) U.S. Cl. ..................... 428/461; 428/213; 428/516; 428/520; 428/463; 428/910; 426/127
(58) Field of Search ................. 428/522, 518, 428/516, 213, 463, 910, 520, 461; 426/127

(56) References Cited

U.S. PATENT DOCUMENTS

| | | | |
|---|---|---|---|
| 5,425,990 A | 6/1995 | Blum et al. | |
| 6,074,731 A * | 6/2000 | Wilkie | 428/215 |
| 6,312,825 B1 * | 11/2001 | Su et al. | 428/484.1 |
| 6,316,114 B1 | 11/2001 | Comer et al. | |
| 6,420,041 B1 | 7/2002 | Amon et al. | |
| 6,503,635 B1 * | 1/2003 | Kong et al. | 428/461 |
| 6,544,660 B1 * | 4/2003 | Lind et al. | 428/516 |
| 6,558,809 B1 * | 5/2003 | Kelch et al. | 428/520 |

FOREIGN PATENT DOCUMENTS

| | | |
|---|---|---|
| EP | 0 763 422 | 3/1997 |
| WO | WO 01/42012 | 6/2001 |

OTHER PUBLICATIONS

Surlyn® Increases Line Speeds, Productivity for Packaging of Squid–Flavored Snacks, from www.dupont.com/packaging/apsprint/ap0121.html, update.

* cited by examiner

Primary Examiner—D. Lawrence Tarazano
(74) Attorney, Agent, or Firm—Morrison & Foerster LLP

(57) ABSTRACT

A biaxially oriented polyolefin multilayer film having a skin layer made of a blend of a polar polymer and a non-polar polymer is disclosed. The film has substantially no inorganic fillers and yet shows no visible distortion after exposure to food products such as potato chips.

30 Claims, No Drawings

POLYOLEFIN OIL RESISTANT FILM USING POLAR POLYMER

RELATED APPLICATIONS

This application claims priority from Provisional Application Serial No. 60/315,672 filed Aug. 30, 2001, entitled the same as above, the entire disclosure of which is hereby incorporated herein by reference.

FIELD OF INVENTION

The invention relates to polyolefinic multilayer film comprising a core layer of polypropylene and at least one outer layer. More specifically, the invention relates to a biaxially oriented polypropylene film that does not distort in the presence of food oils.

BACKGROUND OF INVENTION

Biaxially oriented polypropylene film laminations are commonly used in the snack food packaging industry. In particular, potato chip packaging is a very large volume application.

In the case of potato chip packaging, oils such as cottonseed oil, corn oil, and soybean oil are present on the potato chip surface. Some of this oil on the potato chip surface transfers to the package's internal surfaces. Similarly, other types of baked food snack products also have oils that are known to swell the polypropylene. Since these food oils are non-polar, the polypropylene film absorbs them quite readily, particularly at elevated temperatures. This absorption of food oils by the film gives a distorted appearance to the entire package by causing dimpling in the film.

This surface distortion effectively destroys the surface gloss of the package and gives the appearance that the package has been mishandled. This distortion is undesirable to snack food manufacturers, as they would like to represent the product as being fresh or new to the shelf.

Oriented polypropylene films currently available on the market have attempted to address this issue in two ways. First, by stiffening the film such that the distortions are not so visible to the human eye. Second, by preventing the migration of the food oils into the polypropylene layer(s) of the film.

The stiffening of the film is typically done by adding inorganic fillers such as calcium carbonate, titanium dioxide, etc., to the core layer of the film. The addition of fillers not only provide increased stiffness but could also provide opacity, e.g., by creating voids using $CaCO_3$, and whiteness, e.g., by using $TiO_2$. See, U.S. Pat. Nos. 4,303,708 (Gebhardt), 4,377,616 (Ashcraft), 4,632,869 (Park), 4,652,489 (Crass), 5,134,173 (Joesten), and 6,048,608 (Peet). The common features of these patents is that they use fillers in a core layer for creating opacity in the film and have a void-free layer on the surface of the film that would contact the food products.

Typically, for preventing migration of the food oils to the polypropylene layer(s) of the film, a metallized layer such as an aluminum layer is applied to the inside the film in contact with the food products. The oil does not penetrate though an intact aluminum layer. However, the problems of applying the metallized layer on the inside of the film are the following. First, the metallized layer tends for form cracks through which the oils leak into the polypropylene layer(s) of the film. Second, it is preferred to have the metallized layer on the side of the film that will be the outside surface of the food package. This is because the metallized layer provides a glossy background to the images printed on the surface of the food package.

The idea behind the prior art films was the following. If one can prevent migration of the oils from the food products into the film using a solid, void-free layer on the film surface that would be in contact with the food products, then one should be able to minimize migration of oils into the film. Thereby, one can prevent distortion of the film. If distortion is still visible, the prior art films attempted to minimize distortion by stiffening the films by adding fillers to the core layer.

The approach utilized by the prior art films discussed above has the following impacts. It generally does not prevent migration of the oils into the core layer, but the distortion is suppressed by stiffening the film and increasing the thickness of the film. Stiffening the film makes the film heavier and less flexible while increasing the film thickness increases the cost of the film. Therefore, it is the objective of this invention to provide an economical solution to this package distortion problem caused by the oils of the food product being packaged.

SUMMARY OF THE INVENTION

This invention provides a film that does not distort in the presence of food oils, particularly at elevated temperature conditions. This invention further maintains the necessary properties of the film including oxygen barrier, moisture barrier, cold seal adhesion, and heat seal performance. Achieving these objectives will result in a package with very good surface aesthetics, excellent heat seal or cold seal adhesion performance, and exceptional barrier performance.

As explained above, the prior art structures use fillers to make the film stiff and opaque. In addition, the prior art structures use a void-free layer on the film surface contacting the food products to prevent migration of the food oils into the film.

The applicants of this invention have arrived at a novel approach than that adopted by the prior art structures to solve the problem of distortion. Applicants have found that blending a certain quantity of a polar polymer in a non-polar polyolefin produces a film having excellent oil resistance that exhibits substantially no distortion. Applicants have successfully produced such a film structure that is capable of making a finished package product having the following characteristics: 1) strong seals, 2) excellent barrier, 3) excellent lamination bond strength, 4) excellent print quality, and 5) excellent gloss or surface aesthetics.

Applicants have also determined that increasing the thickness of the lamination can reduce this distortion. Thus, increasing the lamination thickness lends additional structural support to the lamination and reduces the distortion of the entire package. However, increasing the thickness of the lamination is uneconomical since consuming more raw materials is always considerably more expensive.

As will be realized, this invention is capable of other and different embodiments, and its details are capable of modifications in various obvious respects, all without departing from this invention. Accordingly, the description is to be regarded as illustrative in nature and not as restrictive.

DETAILED DESCRIPTION OF THE INVENTION

This invention provides a polyolefin film preferably having at least two layers, including a first skin layer, which is in direct contact with the packaged product. This skin layer could be functional such as a heat seal layer or a cold seal adhesion layer and may also contain void initiating solid particles. A core layer, adjacent to the polyolefin skin layer, may also contain void initiating solid particles. A second polymeric skin layer may also be incorporated on the opposite side of the core layer from the first skin layer. This second polymeric layer may function as a layer for metallization, printing, adhesive lamination, extrusion lamination and coatings. More particularly preferred is a layer for metallization.

The skin layer is made of a blend of a non-polar polyolefin polymer and a polar polymer. The skin layer can function as a heat-seal layer or a layer for cold seal adhesion. The term heat seal is defined as sealing upon the onset of heat. For a package to cold seal, a cold seal cohesive must be pattern applied by a rotogravure coating process to the cold-seal adhesion skin layer. The term cold seal is defined as sealing a product at room temperature with the application of only pressure.

The term blend refers to a material made from two or more polymers mixed together. The blend could further include additional substances such as monomers, oligomers, additives, compatibilizers, etc. A polymer is a molecule made up by the repetition of some simpler unit, the "mer" or monomer.

The blend could be a miscible blend or an immiscible blend. In general, a miscible blend of two polymers forms a substantially homogeneous mixture so as to render the components of the blends indistinguishable from one another. A miscible blend generally has properties somewhere between those of the two unblended polymers. For example, the glass transition temperature, or $T_g$, of a miscible blend of polymer A and polymer B will be a value depending on the ratio of polymer A to polymer B in the blend.

An immiscible blend is a phase-separated mixture of two or more polymers. But strangely enough, the phase-separated materials often turn out to be rather unique and useful. One unusual property of immiscible blends is that one made from two polymers has two glass transition temperatures or $T_g$s. Since the two components of the blend are phase separated, each component retains its separate $T_g$. One can measure the $T_g$ of a blend to find out if it is miscible or immiscible. If two $T_g$s are found, then the blend is immiscible. If only one $T_g$ is observed, then the blend is likely to be miscible.

This invention is not limited to a specific mechanism by which the blend of the polar and non-polar polymers provides improved oil resistance. However, one possible mechanism that could explain the improved oil resistance of the claimed film is that the polar polymer of the blended skin layer would migrate to the outside surface of the skin layer exposed to the environment, which is generally the inside of a food package. The polar polymer would migrate predominantly because of the polarity difference between the two polymers. In addition, the use of a preferred low viscosity or high melt index polar polymer would also facilitate the polar polymer to easily migrate to the surface of the film upon which the food oil resides. The polar polymer acts as a barrier to the food oils that come into physical contact with this layer, since non-polar oils have difficulty penetrating or swelling polar polymers.

In one embodiment, the present invention is a multi-layer sealable polyolefin film that provides excellent distortion resistance to food oils. Specifically, the film is a biaxially oriented polypropylene multi-layer film comprising a first surface layer (which would contact food stuff when the multi-layer film is used in food packaging) containing a blend of a non-polar polyolefin polymer and a polar polymer. Additional layers could include a core layer comprising a polypropylene polymer and second surface layer on the side. The core layer could be between the first and second surface layers. The first and/or second surface layers, preferably of polyolefin, could be further treated by a discharge surface treatment method that imparts a high surface energy.

The core layer can be any polyolefin polymer that can be uniaxially or biaxially oriented. Such polymers include but are not limited to: isotactic polypropylene homopolymer, syndiotactic polypropylene homopolymer, metallocene catalyzed isotactic polypropylene homopolymer, metallocene catalyzed syndiotactic polypropylene, ethylene-propylene random copolymer, butene-propylene random copolymer, high density polyethylene, low density polyethylene, linear low density polyethylene and blends thereof. Most preferred is a core layer of an isotactic polypropylene homopolymer resin. The isotactic polypropylene resin can be defined as having a melt flow in the range of 1–9 g/10 min. More particularly preferred is a melt flow rate in the range of 1–5 g/10 min. Most particularly preferred is a melt flow rate in the range of 1–3 g/10 min.

The core layer can be surface treated with either a standard corona treatment, flame treatment, atmospheric plasma, or a special corona treatment utilizing a mixed gas environment of nitrogen and carbon dioxide. Most preferred is a surface treatment by corona utilizing a mixed gas environment of nitrogen and carbon dioxide. This core layer can then be directly metallized, printed, coated, adhesive laminated, or extrusion laminated. Most particularly preferred is metallization of the core layer.

The skin layer could be a cold seal adhesion layer. The cold seal adhesion layer can be composed of any of the following and blends thereof: an isotactic polypropylene homopolymer, syndiotactic polypropylene homopolymer, metallocene catalyzed isotactic polypropylene homopolymer, metallocene catalyzed syndiotactic polypropylene homopolymer, ethylene-propylene random copolymer, butene-propylene random copolymer, ethylene-propylene-butene-1 terpolymer, low density polyethylene, linear low density polyethylene, very low density polyethylene, metallocene catalyzed polyethylene, metallocene catalyzed polyethylene copolymers, ethylene-methacrylate copolymers, ethylene-vinyl acetate copolymers, and ionomer resins.

This cold seal adhesion layer can be surface treated with either a standard corona treatment, flame treatment, atmospheric plasma, or a special corona treatment utilizing a mixed gas environment of nitrogen and carbon dioxide. Most particularly preferred is corona treatment.

The skin layer could be a heat sealable layer. The heat seal layer can be composed of any of the following and blends thereof: an ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer and ionomer resin.

One aspect of this invention is the use of a polar polymer in the skin layer. When blended with the non-polar polyolefin polymer, the polar polymer is driven to the outside surface of the skin layer. This polar outermost layer will effectively act as a barrier to the food oils and thus prohibit the oils from swelling and distorting the polypropylene film.

The desirable attributes of the polar polymer include the polarity, melt flow rate, and melting temperature. In particular, the melting temperature range is from 76° C. to 158° C.; the melt flow rate is in the range from 4.5 to 14 g/10 min; and the density is in the range from 0.95 to 1.19 g/cc.

Among the polymers that meet these criteria are polyethylene ionomer resins, modified ethylene acrylate polymers, ethylene methacrylic acid copolymer, and amorphous nylon called Surlyn®, Appeel®, Elvaloy®, and Selar PA®, respectively, from DuPont, ethylene acrylic acid copolymers called Primacor® from Dow Chemical Company, ethylene vinyl alcohol copolymer called Eval® from Evalca and ethylene acid terpolymer called Escor® from ExxonMobil.

Surlyn® is a random copolymer of poly(ethylene-co-methacrylic acid) (EMAA). The incorporation of methacrylic acid is typically low (less than 15 mole percent). Some or all of the methacrylic acid units could be neutralized with a suitable cation, commonly $Na^+$ or $Zn^{+2}$. Surlyn® is produced through the co-polymerization of ethylene and methacrylic acid via a high pressure free radical reaction, similar to that for the production of low density polyethylene. The methacrylic acid monomer is more reactive with itself than with ethylene. This leads to a higher reactivity ratio, around four, for methacrylic acid, and could give a blocky incorporation of methacrylic acid along the polymer chain. However, by polymerizing under elevated heat and pressure the reactivity ratios are driven toward one, thus promoting a random incorporation of the co-monomers. The neutralization of the methacrylic acid units can be done through the addition an appropriate base in solution, or in the melt mixing of base and copolymer.

The inclusion of a few mole percent ionic groups along the backbone has a tremendous effect upon the morphology and properties of Surlyn.® Poly(ethylene-co-methacrylic acid) ionomers typically show an increased melt viscosity, toughness, clarity, and adhesion. The increased clarity, a desirable property in packaging applications, is due to the reduction of crystalline content of the copolymer. The presence of the methacrylic acid units and the neutralized carboxylate anion/cation pairs provides sites for ionic interaction. Hydrogen bonding between carboxylic acid moieties could form dimers. Interactions between ion pairs, and the non-polar nature of the backbone, could cause the ions to aggregate together. At low mole percent incorporation of methacrylic acid, or low percent neutralization, the ion pairs will exist as isolated polar groups in the bulk of Surlyn.® However, above a certain critical ionic concentration, the ion pairs will assemble into larger groups. The end result is the formation of an ion rich phase within the bulk of the polymer. The assembled ionic aggregates act as thermally reversible cross-links, greatly modifying the viscoelastic properties of the resulting polymer. These aggregations of ions, typically on the order of a few nanometers in size, serve as scattering centers for small angle x-ray scattering (SAXS). A typical SAXS profile of Suryln® shows low-density polyethylene, poly(ethylene-co-methacrylic acid) and Na+ neutralized poly(ethylene-co-methacrylic acid). In the Na+ neutralized ionomer profile one sees a small angle peak, due to the presence of the ionic aggregates. In general, the aggregation of ions depends on a variety of factors, such as strength of ionic interaction, steric considerations of packing the ionic pairs, and conformational mobility of the polymer backbone.

Surlyn® is a semi-crystalline polymer in both the acid and neutralized forms. The presence of the methacrylic acid units limits the ability of the copolymer to pack in a crystalline lattice, and the ionic interactions slow the formation of spherulites.

The Elvaloy® resin family includes eight ethylene methyl acrylates (EMAs), four ethylene ethyl acrylates (EEAs) and six ethylene butyl acrylates (EBAs). They range in melt flow from 0.4 to 9.0 g/10 min, and acrylate content runs from 7% to 27%.

The Elvaloy® resins have a greater thermal stability than EVAs. The Elvaloy® resins have higher melting points and melt strength than similar acrylate copolymers. A food-grade, high-comonomer EMA resin, Elvaloy 1224 AC (24% acrylate) could preferably be used as a polar polymer in the present invention.

Selar® PA amorphous nylon barrier resins provide unique oxygen barrier properties when wet or chilled, making the resins a good choice for flavorsensitive refrigerated foods and beverages. In bottles, jars and other rigid structures, Selar® PA offers the crystal clarity of glass, but with lower weight and better impact resistance. Selar® PA can be blended with nylon 6 and with EVOH to provide certain property and processing advantages.

In a Primacor® resin, acrylic acid is randomly incorporated with ethylene. The carboxyl groups are free to form bonds and to interact with any polar substrate such as metals, glass, cellulosics, and polyamides. Carboxyl groups on adjacent chains can hydrogen bond with each other. This produces toughness even at relatively low molecular weights. Additionally, the polymer can be cross-linked through the backbone and the acid functionality, allowing further improvements in toughness. The bulky carboxyl groups inhibit the ability of the polymer to crystallize. This improves optical clarity and reduces both melting and softening points.

It is preferred that the polar polymer has a low viscosity to be able to move to the surface effectively during extrusion. The film is typically made by in a biaxially oriented polypropylene process. This processing is very heat sensitive and as such requires that the polar polymer have a relatively high melting temperature. If the skin layer is a sealant layer, then it is preferable that the polar polymer has a relatively low melting temperature to maintain seal properties. Therefore, a balance between processability and performance is required to achieve the end product.

While low viscosity of the polar polymer is preferred as explained above, yet very low viscosity is not preferred because the miscibility between a very low viscosity polar polymer and the non-polar polymer in the skin layer, preferably a polyolefin, can be poor. Also, very low viscosity polar polymer could result in poor molecular entanglement between the molecules of the polar polymer and the non-polar polymer in the skin layer.

The viscosity of the polar and non-polar polymers is a function of the molecular weight. Preferably, the number average molecular weight (Mn) should be greater than about 5,000. More preferably, Mn should be greater than about 20,000. The polar and/or non-polar polymers could have Mn in the range of about 10,000 to about 150,000, more preferably in the range of about 25,000 to about 100,000, and most preferably in the range of 50,000 to 75,000. The polar and/or non-polar polymers could have a polydispersity (Mw/Mn), where Mw is weight average molecular weight, in the range of about 1.1 to about 15, preferably in the range of about 1.5 to about 10, more preferably in the range of about 2 to about 6, and most preferably in the range of about 3 to about 5.

The amount of the polar polymer in the skin layer could be in the range of about 1 to about 50 percent by weight. Preferably, the amount of the polar polymer in the skin layer should be in the range of about 5 to about 25 weight percent. Most preferably, the amount of the polar polymer in the skin layer should be in the range of about 10 to 20 weight percent. The amount of the polar polymer should be at least as much as would be required to form a layer of polar molecules on the skin layer.

EXAMPLES

A 65 gauge biaxially oriented polypropylene (BOPP) film was manufactured on a 1.5-meter wide BOPP production line. The skin layer was measured at 6 gauge units. The skin layer used an ethylene-butene-propylene terpolymer at a melt flow rate of 9.5 g/10 min as measured by ASTM D1238. A certain amount by weight of the polar polymer was added to the skin layer as shown in Table 1. Isotactic polypropylene resin was used in the core layer. The melt flow rate of the core isotactic polypropylene homopolymer was 1.6 g/10 min.

The films were metallized in a Shimadzu bell jar metallizer that evaporated aluminum on the core side of the film. Potato chips were then crushed into small pieces. Ten grams of the crushed potato chips were weighed and placed in a 9.6 in$^2$ surface area on the skin layer side of the film. The samples were next placed in a convection oven at 115° C. for 3 and 6 hours respectively. The crushed chips and oil were then cleaned from the surface with isopropyl alcohol. The samples were evaluated qualitatively for film distortion by seeing the amount of dimpling occurring in the film. A rating of 5 was given for the worst distortion, a rating of 0 was given for a sample that has no distortion. Thus, the data in Table 1 is based on this relative ranking system.

TABLE 1

Effect of Polar Resin in Skin Layer on Oil Resistance of OPP Films.

| | | | Oil Dimpling Rate after, hrs | | | |
|---|---|---|---|---|---|---|
| Sample # | Polar Resins | % | 1 | 2 | 3 | 6 |
| 1 | Control, None | N/A | 1 | 1 | 2 | 3 |
| 2 | EMA Elcalay AC 1820 | 10 | 1 | 2 | 2 | 2 |
| 3 | EMA Elcalay AC 1820 | 20 | 0.5 | 1 | 1 | 2 |
| 4 | EA Terpolymer AT-320 | 10 | 0.5 | 0.5 | 1 | 2 |
| 5 | EA Terpolymer AT-320 | 20 | 0.5 | 0.5 | 0.5 | 1 |
| 6 | EAA Primacor 3440 | 10 | 0.5 | 0.5 | 0.5 | 1 |
| 7 | Ionomer Surlyn 1702 | 10 | 1 | 1 | 1 | 2 |

Sample 1 (Control) contains no polar polymer in the skin layer. The skin layer of Samples 1–7 contains ethylene-propylene-butylene (EPB) terpolymer as the non-polar polymer. A non-polar polymer such as EPB also acts as a sealant.

Table 1 shows that the distortion in the Control film was bad after testing for distortion. The distortions in the films of Samples 5 and 6 were substantially non-existent after testing for distortion. By comparing the films of Samples 5 and 6, it was seen that just 10-weight percent ethylene acrylic acid (EEA) in the skin layer provides oil dimple rating of 1. On the other hand, the same rating was obtained by 20-weight percent of ethylene acid (EA) terpolymer used in the skin layer. This is possibly because EEA in Sample 6 could more effectively migrate to the surface of the skin layer than EA in Sample 5.

By comparing the films of Samples 2 and 3, in which the amount of the polar polymer (EMA) was 10 and 20 weight percent, respectively, in the skin layer, one notices the following. First, by increasing the amount of polar polymer in the skin layer, it is possible to delay the onset of dimpling. However, it appears that the maximum oil dimple rate is controlled by the presence of the type of polar polymer on the surface of the skin layer, not so much by the amount of the polar polymer present in the skin layer.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the priority documents, patents and publications referred in this application are hereby incorporated herein by reference.

What is claimed is:

1. A biaxially oriented polyolefin multilayer film comprising a skin layer comprising a blend of a polar polymer and a non-polar polymer, the skin layer having a surface exposed to an environment surrounding the film and being a single layer, wherein a number average molecular weight of the polar polymer is greater than about 5,000, an amount of the polar polymer in the skin layer is in the range from about 1 to about 50 weight percent based on the total weight of the skin layer and the non-polar polymer comprises polyolefin, the film further comprising a metallized layer opposite the skin layer, wherein the non-nolar polymer comprises nolypronylene.

2. The film of claim 1, wherein the polar polymer is on a surface of the skin layer exposed to an environment.

3. The film of claim 1, wherein the polar polymer and the non-polar polymer are immiscible.

4. The film of claim 1, wherein the number average molecular weight of the polar polymer is greater than about 20,000.

5. The film of claim 1, wherein an amount of the polar polymer in the skin layer is in the range from about 5 to about 40 weight percent based on the total weight of the skin layer.

6. The film of claim 1, wherein an amount of the polar polymer in the skin layer is in the range from about 10 to about 20 weight percent based on the total weight of the skin layer.

7. The film of claim 1, wherein an amount of the non-polar polymer in the skin layer is about 50 weight percent or more based on the total weight of the skin layer.

8. The film of claim 1, wherein the skin layer is a cold seal adhesion layer, a heat sealable layer, or combinations thereof.

9. The film of claim 8, wherein the cold seal adhesion layer is surface treated with a corona treatment, a flame treatment, atmospheric plasma, or a corona treatment utilizing a mixed gas environment of nitrogen and carbon dioxide.

10. The film of claim 8, wherein the cold seal adhesion layer comprises a material selected from the group consisting of an isotactic polypropylene homopolymer, syndiotactic polypropylene homopolyiner, metallocene catalyzed isotactic polypropylene homopolymer, metallocene catalyzed syndiotactic polypropylene bomopolymer, ethylene-propylene random copol ymer, butene-propylene random copolymer, ethylene-propylene-butene-1 terpolymer, low density polyethylene, linear low density polyethylene, very low density polyethylene, metallocene catalyzed polyethylene, metallocene catalyzed polyethylene copolymers, ethylene-methacrylate copolymers, ethylene-vinyl acetate copolymers, ionomer resins and combinations thereof.

11. The film of claim 8, wherein the heat sealable layer comprises a material selected from the group consisting of an ethylene-propylene random copolymer, ethylene-butene-1 copolynier, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer, ionomer resin and combinations thereof.

12. The film of claim 1, further comprising a core layer.

13. The film of claim 12, wherein the core layer comprises a material selected from the group consisting of isotactic polypropylene homopolymer, syndiotactic polypropylene homopolymer, metallocene catalyzed isotactic polypropylene homopolymer, metallocene catalyzed syndiotactic polypropylene, ethylene-propylene random copolymer, butene-propylene random copolymer, high density polyethylene, low density polyethylene, linear low density polyethylene and combinations thereof.

14. The film of claim 12, wherein the core layer is surface treated with a corona treatment, a flame treatment, atmospheric plasma, or a corona treatment utilizing a mixed gas environment of nitrogen and carbon dioxide.

15. The film of claim 1, wherein the metallized layer comprises aluminum and has an optical density in the range of from about 1.6 to about 3.5.

16. The film of claim 1, wherein a thickness of said skin layer is in a range of about 5% to about 25% of the total thickness of the film.

17. The film of claim 1, wherein a thickness of said skin layer is in a range of about 10% to about 20% of the total thickness of the film.

18. The film of claim 1, wherein the polar polymer has a melting temperature in a range from about 50° C. to about 145° C.; a melt index in a range from about 2 g/10 mm to about 20 g/10 mm; and a density in a range from about 0.91 g/cc to about 0.97 g/cc.

19. A food package comprising a biaxially oriented polyolefin multilayer film of claim 1.

20. The food package of claim 19, wherein a thickness of said skin layer is in a range of about 5% to about 25% of the total thickness of the film.

21. The food package of claim 19, wherein a thickness of said skin layer is in a range of about 10% to about 20% of the total thickness of the film.

22. The food package of claim 19, further comprising an adhesive layer.

23. The food package of claim 19 comprising substantially no inorganic fillers.

24. The food package of claim 19, wherein the polar polymer has a melting temperature in a range from about 50° C. to about 145° C.; a melt index in a range from about 2 g/10 mm to about 20 g/10 mm; and a density in a range from about 0.91 g/cc to about 0.97 g/cc.

25. The film of claim 1, wherein the amount of the polar polymer in the skin layer is in the range from about 5 to about 50 weight percent based on the total weight of the skin layer and the non-polar polymer comprises polyolefin.

26. The film of claim 1, wherein the environment is food products and the film shows no visible distortion after exposure to the food products.

27. The film of claim 1, wherein the film shows no visible distortion after the skin layer is directly in contact with food products.

28. The film of claim 1, wherein the skin layer has a layer of polar molecules thereon.

29. The food package of claim 19, further wherein a thickness of said skin layer is in a range of about 1% to about 40% of the total thickness of the film.

30. The film of claim 1, wherein the non-polar polymer comprising polypropylene is a copolymer or terpolymer of polypropylene.

* * * * *